United States Patent [19]

Simandl et al.

[11] Patent Number: 5,268,395
[45] Date of Patent: Dec. 7, 1993

[54] MICROCELLULAR CARBON FOAM AND METHOD

[75] Inventors: Ronald F. Simandl, Farragut; John D. Brown, Harriman, both of Tenn.

[73] Assignee: Martin Marietta Energy Systems, Inc., Oak Ridge, Tenn.

[21] Appl. No.: 17,562

[22] Filed: Feb. 16, 1993

Related U.S. Application Data

[62] Division of Ser. No. 960,600, Oct. 13, 1992, Pat. No. 5,208,003.

[51] Int. Cl.$^5$ .............................................. C08J 9/28
[52] U.S. Cl. ...................................... 521/142; 521/64; 521/918; 264/29.7
[58] Field of Search .................. 521/64, 142, 918; 264/29.7

[56] References Cited

U.S. PATENT DOCUMENTS

| | | | |
|---|---|---|---|
| 2,734,041 | 2/1956 | Jones et al. | 524/280 |
| 2,851,434 | 9/1958 | Jones et al. | 524/287 |
| 3,810,963 | 5/1974 | Benton et al. | 264/29.1 |
| 3,922,334 | 11/1975 | Marlk et al. | 423/445 |
| 3,940,361 | 2/1976 | Sommerfield | 524/751 |
| 4,022,875 | 5/1977 | Vinton et al. | 423/445 |
| 4,154,704 | 5/1979 | Vinton et al. | 502/433 |
| 4,261,937 | 4/1981 | Rinde | 264/28 |
| 4,325,737 | 4/1982 | Rinde | 521/61 |
| 4,379,875 | 4/1983 | Samuels et al. | 524/104 |
| 4,687,801 | 8/1987 | Mitani et al. | 524/104 |
| 4,703,105 | 10/1987 | Allada | 528/483 |
| 4,756,898 | 7/1988 | Hopper et al. | 502/180 |
| 4,775,655 | 10/1988 | Edwards et al. | 502/416 |
| 4,782,097 | 11/1988 | Jain et al. | 521/56 |
| 4,832,881 | 5/1989 | Arnold, Jr. et al. | 264/29.7 |
| 4,859,711 | 8/1989 | Jain et al. | 521/56 |
| 4,894,215 | 1/1990 | Kawakubo et al. | 264/29.1 |
| 4,943,618 | 7/1990 | Stog et al. | 525/340 |
| 4,999,385 | 3/1991 | McCullough, Jr. et al. | 502/402 |
| 5,045,298 | 9/1991 | Muramatsu et al. | 423/445 |
| 5,047,437 | 9/1991 | Cooke et al. | 521/56 |

Primary Examiner—Morton Foelak
Attorney, Agent, or Firm—Earl Larcher; Joseph A. Marasco; Preston H. Smirman

[57] ABSTRACT

A microcellular carbon foam characterized by a density in the range of about 30 to 1000 mg/cm$^3$, substantially uniform distribution of cell sizes of diameters less than 100 μm with a majority of the cells being of a diameter of less than about 10 μm, well interconnected strut morphology providing open porosity, and an expanded d(002) X-ray turbostatic spacing greater than 3.50 angstroms. The precursor for the carbon foam is prepared by the phase inversion of polyacrylonitrile in a solution consisting essentially of at least one alkali metal halide and a phase inversion solvent for the polyacrylonitrile.

2 Claims, No Drawings

MICROCELLULAR CARBON FOAM AND METHOD

This invention was made with the support of the United States Government under contract No. DE-AC05-84OR21400 awarded by the U.S. Department of Energy. The United States Government has certain rights in this invention.

This application is a division of application Ser. No. 07/960,600, filed Oct. 13, 1992, now U.S. Pat. No. 5,208,003.

BACKGROUND OF THE INVENTION

The present invention relates generally to microcellular carbon foam precursors based on foamed gels of polyacrylonitrile (PAN), and more particularly to microcellular carbon foam prepared from such precursors and characterized by a well-interconnected strut morphology, an expanded d(002) X-ray turbostatic spacing, and a uniform distribution of cell sizes with the majority of cells having diameters less than about 10 micrometers ($\mu$m).

Microcellular carbon foams having open porosity with cell sizes less than about 100 $\mu$m have been successfully used as catalyst supports, absorbents, filters, electrodes and the like. Microcellular carbon foams have been produced from precursors prepared by various manufacturing processes including sol-gel, replication and phase inversion processes. These processes are generally described in the publication "Low-Density Microcellular Materials", R. W. Hopper et al, Report No. UCRL-JC-104935, Lawrence Livermore National Laboratory Preprint, December 1990. The phase inversion process as described in this publication and in U.S. Pat. No. 4,832,881, issued May 23, 1989, involves dissolving polyacrylonitrile and other carbonizable polymers in a suitable solvent such as maleic anhydride, methyl sulfone blends with water or cyclohexanol or norcamphor, dimethyl sulfoxide with ethylene glycol, ethylene carbonate, and dimethylformamide with water, at an elevated temperature and cooling the resulting solutions at a controlled rate to allow the selected polymer to undergo phase inversion and form a porous gel. The solvent is removed from the gel by vacuum sublimation or extraction with supercritical carbon dioxide. The porous gel is then air cured at an elevated temperature and carbonized to form a microcellular carbon foam product.

While previous phase inversion processes for preparing carbon foam precursors such as generally described above have been found to be successful, there are still some shortcomings which detract from the known phase inversion processes. For example, when using solid solvents such as maleic anhydride only relatively small and thin castings (less than about 1 cm in thickness) of the carbon foam precursors can be produced without the carbon foam being highly stressed and subject to cracking due to the brittle nature of maleic anhydride. Also, when a solid solvent such as maleic anhydride freezes, the resulting stress of the gel during the formation thereof imparts a ring defect know as a Liesegang ring structure into the gel. Further, the production of microcellular carbon foam in a relatively low density range of about 30 to 100 mg/cm$^3$ by the phase inversion of polyacrylonitrile dissolved in solvents such as gamma-butyrolactone, dimethyl sulfoxide, ethylene carbonate and maleic anhydride has not proven to be adequately satisfactory. It was found that this problem in the production of low density carbon foams was due to the fact that while these solvents are capable of dissolving polyacrylonitrile at elevated temperatures they either fail to adequately release the dissolved polymer at lower temperatures or release the polymer as a poorly interconnected ball precipitate which results in a highly friable carbon foam.

It was also found that the preparation of microcellular carbon foams in a density range of about 30 to 1000 mg/cm$^3$ while providing such carbon foams with well interconnected strut morphology has not been satisfactorily achieved in a reproducible manner by the practice of previously know phase inversion processes, particularly since the carbon foams could be produced in only relatively small sizes or often exhibited poorly interconnected strut morphology which detracted from the use of such carbon foams in many applications such as filters for corrosives liquids. Additionally, it was expected that microcellular carbon foam with a well interconnected strut morphology as previously available would be useful in the fabrication of super capacitors or in lithium battery applications such as providing an intercalation anode structure for secondary lithium batteries or a cathode for primary lithium batteries. However, even the microcellular carbon foams with well-defined strut morphologies as previously provided have not been proven to be adequate for such super capacitor and battery applications since the expanded d(002) X-ray turbostatic spacing of existing microcellular carbon foams often is less than 3.50 angstroms (Å) which is insufficient to provide for repeated intercalation of Li$^+$ ions without spalling of the carbon gallery. Moreover, any graphitic character of the carbon reduces the d(002) spacing toward that of graphite (3.37 Å) and further aggravates spalling during intercalation.

SUMMARY OF THE INVENTION

Accordingly, it is a principal aim or objective of the present invention to provide a carbonizable precursor for the production of microcellular carbon foams of a density in a range of about 30 to 1000 mg/cm$^3$ and characterized by well interconnected strut morphology, a uniform distribution of cell sizes having diameters less than 20 $\mu$m with the majority of the cells having diameters less than about 10 $\mu$m, and an expanded d(002) X-ray turbostatic spacing greater than 3.50 angstroms (Å) which is sufficient for intercalation of lithium ions in lithium battery applications and suitable for use in super capacitors.

Another object of the present invention is to provide a method for producing monolithic microcellular carbon foam from polyacrylonitrile by the phase inversion thereof in selected solvents in the presence of one or more alkali halides which facilitate the solubilization of the molecules of the polyacrylonitrile in solution and maintains them in extended positions for effecting the desired strut morphology and the desired d(002) X-ray turbostatic spacing when carbonized.

Generally, in accordance with one aspect of the present invention, a precursor is provided for producing microcellular carbon foam having the aforementioned properties. A porous foam or gel is prepared by the phase inversion of polyacrylonitrile in a solution consisting essentially of at least one alkali halide and a phase inversion solvent for the polyacrylonitrile. The solvent and much of the alkali halides are extracted from the gel to form a firm, free standing porous foam which is evacuated and cross linked, preferably by using maleic anhydride vapor air cured at an elevated temperature and then carbonized to provide the microcellular carbon foam.

The method for producing microcellular carbon foam having the aforementioned properties comprises the steps of: dissolving polyacrylonitrile in a heated solution consisting essentially of at least one dissolved alkali metal halide and a solvent for the dissolution of the polyacrylonitrile and the phase inversion of the polyacrylonitrile to the liquid gel upon adequate cooling of the solution; placing the heated solution including the dissolved polyacrylonitrile in containment means provided with one of a gel-nucleation promoting means and a relatively smooth surface; sufficiently cooling the heated solution in the containment means to form a liquid gel of the polyacrylonitrile by phase inversion; removing the solvent and substantially all of the dissolved alkali metal halide from the gel to provide a porous foam consisting essentially of polyacrylonitrile; removing residual traces of solvent under vacuum and cross linking the polyacrylonitrile foam; curing the porous foam at an elevated temperature in an oxygen containing environment (e.g., air); and, heating the porous foam in an inert atmosphere to a temperature sufficient to carbonize the polyacrylonitrile forming the porous foam to provide a microcellular carbon foam product.

The solvent used for the phase inversion of the polyacrylonitrile is preferably selected from the group consisting of propylene carbonate, tetramethylene sulfone (sulfolane), gamma-butyrolactone, and mixtures thereof such as propylene carbonate and tetramethylene sulfone, propylene carbonate and gamma-butyrolactone, or propylene carbonate, tetramethylene sulfone, and gamma-butyrolactone.

In this method the heated solution of solvent and alkali metal halide containing the polyacrylonitrile consists essentially of about 0.75 to about 20 wt. % polyacrylonitrile, about 68 to about 99.20 wt. % solvent, and a sufficient concentration of alkali metal halide to promote solubilization and the unraveling of the highly crystalline, helical molecules of polyacrylonitrile in solution and to maintain these molecules in extended positions to promote interconnected strut formation and expanded d(002) X-ray turbostatic spacing during the formation of the gel by phase inversion. This concentration of alkali metal halide is in the range about 0.05 to about 2 wt. % and is selected from the group including bromides, chlorides and iodides of lithium, sodium, and potassium, particularly lithium bromide and sodium iodide. Reticulated foams made with the alkali metal halide are very reactive and readily combust when cured in air at temperatures of 180° C. or higher, additional organic additives reduce the problem of foam combustion during elevated temperature air curing. Preferably, about 1.0 phs triethanolamine or TEA, is added to the solution to satisfactorily provide this function if curing is achieved at temperatures of 180° C. or higher.

Other and further objects of the present invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE INVENTION

As generally described above the present invention is directed to producing microcellular carbon foam from a porous cellular polymer foam prepared by the phase inversion of polyacrylonitrile that has been dissolved in a suitable solvent or mixture of solvents in the presence of at least one alkali metal halide. The phase inversion of polyacrylonitrile forms a well interconnected liquid gel with the polyacrylonitrile providing a continuous strut forming phase and the solvent including the alkali metal halide as the internal droplet phase. These gels provided by the present invention are not fluid and are characterized by their firmness so as to inhibit damage or deformation thereof during normal handling procedures. Microcellular carbon foam produced from this precursor can be prepared to possess a density in the range of about 30 to 1000 mg/cm$^3$ with the carbon foam being characterized by a well interconnected strut morphology providing open porosity, a uniform distribution of cell sizes having diameters less than about 20 $\mu$m with the majority of the cells having a diameter less than about 10 $\mu$m. The carbon foam is characterized by possessing an expanded d(002) X-ray turbostatic spacing of greater than 3.5 angstroms which, as mentioned above, is a particularly desirable characteristic for use of the carbon foam in super capacitor and rechargeable lithium battery applications.

The polyacrylonitrile employed in the practice of the present invention preferably has a molecular weight of about 150,000 and is finely ground to a particle size of less than about 0.5 mm to facilitate the dissolving thereof in the hot solvent solutions.

The solvents utilized for production of the firm, liquid gels using the phase inversion of polyacrylonitrile is a solvent selected from the group of solvents capable of dissolving the polyacrylonitrile and which will permit phase inversion to occur. Also, these solvents are such that they can be extracted from the gel upon completion of the formation thereof by vacuum sublimation or preferably, by solvent exchange followed by supercritical carbon dioxide extraction procedures, both as well known in the art. Satisfactory solvents for use in the practice of the present invention include propylene carbonate, tetramethylene sulfone, gamma-butyrolactone, or a mixture of propylene carbonate with tetramethylene sulfone or gamma-butyrolactone. The particular solvent or mixture of solvents employed in the practice of the present invention is dependent upon the particular density of the carbon foam being produced. For example, in a preparation of the precursors for providing microcellular carbon foam of relatively low densities in the range of about 30 to 100 mg/cm$^3$ propylene carbonate alone is used. For higher density carbon foam, especially above about 400 mg/cm$^3$, gamma-butyrolactone, and other known solvents for polyacrylonitrile such as dimethyl sulfoxide, ethylene carbonate, tetramethylene sulfone, and maleic anhydride were found to be capable of dissolving polyacrylonitrile at elevated temperatures but these solvents were found to either fail to release the polyacrylonitrile at lower temperatures or else they released the polyacrylonitrile in the form of poorly interconnected ball precipitate. Carbon foams produced from these precursors were relatively friable due to poor strut morphology whereas, in the present invention, the solvents propylene carbonate and mixtures of propylene carbonate with tetramethylene sulfone or gamma-butyrolactone produced a firm gel with well-interconnected strut morphology which was capable of providing a carbon foam considerably less friable than carbon foams having ball morphologies.

While the solvents utilized in the practice of the present invention are capable of forming liquid gels by the phase inversion of the polyacrylonitrile, these solvents or solvent mixtures by themselves will not provide a sufficient level of phase inversion to form adequately firm gels capable of self support (so as to not be easily damaged during normal handling procedures) and which will provide a carbon foam with desired strut morphology and d(002) X-ray turbostatic spacing. This is particularly true where the polyacrylonitrile content in the gel is less than 3 parts per hundred (phs) with the resulting carbon densities being less than 200 mg/cm$^3$. Therefore, in accordance with the present invention a relatively low concentration of one or more alkali metal halides (particularly lithium bromide and/or sodium iodide) is provided in the solution with the solvents and solvent mixtures used for the phase inversion of polyacrylonitrile. This concentration (typically 1000 ppm) of the alkali metal halide is adequate to promote solubilization and the unraveling of the highly crystalline, helical polyacrylonitrile molecules in solution and then maintaining these molecules extended for effecting the desired strut formation of the gel during phase inversion.

The at least one alkali metal halide utilized in the present invention is selected from the chloride, bromide, and iodides of lithium, sodium, and potassium and is used in concentrations in the range of about 500 to 1000 ppm for each alkali metal halide. A greater concentration of the alkali metal halides can be used in the practice of the invention since such larger concentrations will promote solubilization of more polyacrylonitrile but such larger concentrations have not been found to be necessary for providing the gel with the desired level of firmness and strut morphology. Sodium and potassium halides function somewhat similarly to the lithium halides in the solvent solution. Sodium iodide has been found to react synergistically with the lithium bromide in providing for additional gel firmness.

A gel produced using 4 phs polyacrylonitrile in propylene carbonate without additives is relatively soft. One thousand ppm sodium iodide produces a slightly firmer gel over a longer period of time. One thousand ppm of lithium bromide more than doubles the gel firmness and reduces the time required for obtaining that firmness. This concentration of lithium bromide plus 100 ppm sodium iodide act synergistically to increase firmness about another 8%. While actually decreasing gel firmness by themselves, various amine additives such as diethylenetriamine (DETA), triethanolamine (TEA), and piperazine, each in a concentration of about 1 phs, actually increase the gel firmness in the presence of 1000 ppm lithium bromide and 1000 ppm sodium iodide. Among these amine additives, TEA alone reduces the high reactivity of the polyacrylonitrile polymer foams which readily combust during air curing near the temperature of 180° C.

The concentration of the solvents utilized in the present invention include 68 to 99 wt % propylene carbonate, about 68 to 99 wt % of a mixture of propylene carbonate with 1 to 30 wt % tetramethylene sulfone, and about 68 to 99 wt % of a mixture of propylene carbonate with 1 to 30 wt % gamma-butyrolactone. In the mixtures of propylene carbonate with tetramethylene sulfone or gamma-butyrolactone, the propylene carbonate provides about 60 to 98 wt %, and varies with the concentration of polyacrylonitrile to be dissolved. For concentrations of polyacrylonitrile below 8 phs propylene carbonate alone provides adequate solubility for the polyacrylonitrile. Above 8 phs polyacrylonitrile content, typically 10 to 20 wt %, sulfolane or gamma-butyrolactone is required to solubilize the excess polyacrylonitrile. More than 30 wt/% of these latter two solvents contribute to a closed-cell morphology and contribute to excessive shrinkage of the foam by plasticizing the foam struts.

In the preparation of the gel by phase inversion, the polyacrylonitrile in fine powder form is blended with the solvent and at least of the alkali metal halides. The resulting solution is heated, preferably prior to the addition of the polyacrylonitrile, to a temperature in the range of about 130° to 160° C. for promoting the dissolution of the polyacrylonitrile. The maximum temperature of about 160° C. is used since higher temperatures tend to degrade the polyacrylonitrile and cause excessive darkening of the solution. After the polyacrylonitrile powders dissolve in the solution, as usually evidenced by a clear solution, up to 1 phs triethanolamine is added to reduce the tendency of the resulting very reactive polyacrylonitrile foams to combust during air curing at temperatures of 180° C. or higher. The solution is heated approximately 30 minutes after adding the TEA. When drying and air curing at temperatures less than 180° C. such combustion does not occur so as to obviate the need for TEA additive. The hot solution is then poured into a suitable container or vessel formed of an inert material such as glass, stainless steel or the like which has been preheated to about 150° C. The solution is then allowed to cool to ambient temperature conditions for effecting the phase inversion of the polyacrylonitrile.

When the polyacrylonitrile content is less than 3 phs, i.e., when a carbon foam density less than 200 mg/cm$^3$ is desired, the use of a nucleation promoting surface in the vessel receiving the hot solution is necessary. It has been found that the use of such a nucleating surface contributes to the formation of the strut morphology and firmer gels. In fact, for large castings where carbon foams with densities of about 50 mg/cm$^3$ are desired, the use of a nucleating surface is necessary to provide gels of sufficient firmness to permit normal handling without damaging the gels. A suitable nucleating surface for use in the practice of the present invention is a perforated, thin-walled, steel liner positionable inside of a glass casting dish. Such a liner is commercially available as "Micro-Etch", from Buckbee-Mears Co., ST. Paul, Minn. The commercially available nucleating surface is a thin stainless steel liner which is preferably formed to be in the shape of a basket to facilitate handling of the lower density gels. The stainless steel liner was made from type 316 stainless steel with wall thicknesses of 203 μm and 356 μm. The 203 μm thick liner was provided with 178 μm diameter holes with the centers of the holes separated from one another by a 559 μm distance, The 356 μm thick liner is provided with 381 μm diameter holes having their centers spaced apart by a distance 787 μm. Another satisfactory nucleating surface is one provided by porous cotton bond paper or filter paper. Other nucleating surfaces which function satisfactorily in the practice of the present invention were found to be less effective than that of the perforated steel liner or the cotton bond paper. For example, etched glass dish surfaces promoted nucleation but were found to be less effective in the low density gel range than the perforated steel or paper liners so as to make the handling of the gel more difficult for solvent extraction purposes.

The gels for producing carbon foams of densities greater than about 200 mg/cm$^3$ (greater than 3 phs PAN in the melt) were prepared with sufficient firmness without the use of a nucleating mechanism. These higher density gels may be readily formed by directly casting the hot solution into a mold preheated to a temperature of about 130° to 160° C. The resulting gels possess sufficient structural integrity and firmness to survive normal handling including the removal of these gels from the glass mold and the extraction of the solvents from the gels.

During the phase inversion process, the vessel containing the hot solution is preferably placed on an insulated surface so as to inhibit heat loss. This vessel is also preferably provided with an insulated cover formed from matted ceramic fibers which slows heat loss from the solution and also absorbs solvent vapors which may condense and damage the gel during the formation thereof due to vapor refluxing. The cooling of the solution is preferably achieved over the duration of about 1 to 24 hours since the gelation of the polyacrylonitrile from the solvents, particularly tetramethylene sulfone, is a relatively slow process and the strut morphology is compromised by using relatively fast cooling rates.

After forming the gels and removing the gels from the vessel, if the solvents are solid, they may be extracted by using conventional vacuum sublimation techniques if the vapor pressures of the solvents will permit such extraction. However, if these solvents are liquid they are preferably extracted by using supercritical carbon dioxide extraction procedures since it was found that during vacuum sublimation the gas-liquid inter facial tensions are sufficient to cause collapse of the polymer cell walls during solvent evaporation. If the liquid solvent is not easily extractable by using supercritical carbon dioxide, the liquid solvent or mixtures thereof is replaced or exchanged with an alcohol-type solvent such as methanol, ethanol, isopropanol, or dipropylene glycol monomethyl ether, or a ketone type such as acetone followed by the supercritical gas extraction.

In order to assure that the replacement or exchanging of the solvents is complete or adequately complete, to permit supercritical carbon dioxide extractions, an oil soluble dye such as available from Dupont as "Oil Blue A" may be used in the solution during the formation of the gel. Normally about 0.01 to 0.02 g of this oil soluble dye in a solution containing 500 g solvent is satisfactory. A more quantitative measure of degree of readiness of a gel for supercritical carbon dioxide extraction is the density of the alcohol/propylene carbonate solution in which the gel has been soaking. Typically with gels that are less than 5 cm thick equilibrium is reached in methanol within 5 to 6 days. While carbon dioxide extractions have successfully been made on dense (about 6 phs PAN) gels with a 30% propylene carbonate/70% methanol solvent content, the lower density gels (less than 4 phs PAN) need to be solvent exchanged until the propylene carbonate content is less than about 5%, preferably less than 2 wt/% propylene carbonate. Upon completion of the extraction of the solvents the resulting polyacrylonitrile foams are heated under less than 20 μm vacuum to 60° to remove any trace or residual solvent that may have been entrapped in the polymer webbing. If this solvent is allowed to remain, it will cause excessive shrinkage of the foam during air curing at elevated temperature.

Following evacuation, the foams are cross linked, preferably with maleic anhydride vapor. This cross linking step is accomplished in a vacuum oven where a foam sample is placed with about 50 g maleic anhydride. The oven is evacuated to less than 200 μm and sealed off. The oven temperature is raised to 50° C. and then 10° C. per day thereafter until the oven temperature reaches 90° C. Foam parts are held in the maleic anhydride vapor at 90° C. for typically 7 to 10 days. At the end of this period, the oven is evacuated and maleic anhydride pumped out at 100° C. for 2 days. Failure to cross link the foam results in a polyacrylonitrile foam that shrinks excessively during air curing and that collapses during carbonization to nearly fully dense carbon.

Following cross linking, the polyacrylonitrile foam is air cured at an elevated temperature, preferably 170° to 180° C., and then carbonized in an inert gas atmosphere with the carbonization temperatures being ramped or sequentially staged up to a temperature of less than about 1100° C., preferably about 1100° C.

The air curing of the porous polyacrylonitrile foam after the supercritical carbon dioxide extraction of the solvents is provided by heating the foam in air at a temperature in a range of about 150° C. for a period of about 48 to 72 hours. However, since the porous foam preferably contains at least about 500 ppm residual alkali metal halide following the solvent extraction operation, the foam containing the alkali metal will combust at a temperature of above about 180° C.; thus, the curing of the foam must be achieved at a temperature less than about 180° C. unless the TEA is added to suppress combustion. Completion of the air cure is determined visually at that point when the foam appears uniformly dark brown. Carbonization of a polyacrylonitrile foam prior to this point will result in excessive shrinkage, densification, and cracking of the resulting carbon foam.

The carbonization of the cured carbon precursors is provided in an inert atmosphere such as provided by a flowing inert gas selected from helium, nitrogen, argon or mixtures thereof. By employing a staged heating operation that is preferably provided by heating the carbon foam precursors from ambient temperature to about 90° C. at a rate of about 2°-4° C./min, preferably 3° C./min, then heating the foam from 90° C. to 200° C., preferably at a rate of about 1° C./min and soaking at 200° C. for a period of about 3 to 5 hours (preferably 4 hours). The foam is then heated from about 200° C. to about 250° C. at a relatively slow rate, preferably 1° C./min, and soaked at 250° C. for a period of about 3 to 5 hours (preferably 4 hours). The foam is then ramped at the selected heating rate, preferably 1° C./min, to 295° C. and soaked for a period of about 3 to 5 hours (preferably 4 hours). The foam is further ramped to 500° C., preferably at 1° C./min, and soaked for about 7 to 9 hours (preferably 8 hours). The foam is then heated from 500° C. to 1100° C., preferably at a rate of 2° C./min, and then again soaked for a suitable period of 7 to 9 hours (preferably 8 hours) to complete the conversion of the foamed polyacrylonitrile to a carbon foam structure. During carbonization polyacrylonitrile foams usually experience 50 to 60% shrinkage in linear dimensions, a factor of about 10 volume shrinkage, and a 50% weight loss for an overall densification factor of 5 or 6.

If desired, the carbonized microcellular foam can be converted to a graphitic phase by further heating the carbonized foam in an inert atmosphere to a temperature in the range of about 2400° C. to 3000° C. A holding or soak period of about 1 to 24 hours at the selected temperature converts to the amorphous carbon structure to one with increasing graphitic structure. For example, a sample of amorphous polyacrylonitrile carbon ramped at the rate of 4° C./min up to 2000° C. in argon then allowed to cool without a soak period at 2000° C. was found to have 20% graphitic character. However, the conversion of the carbon foam to a graphitic phase will reduce the d(002) turbostatic spacing to less than 3.5 angstroms.

In order to provide a more facile understanding of the present invention, several examples of preparing carbon foams in accordance with the method of the invention are set forth below.

EXAMPLE 1

A microcellular carbon foam with the density of approximately 135 mg/cm$^3$ was prepared by blending a mixture of 1000 g (99% purity) of propylene carbonate with 1.0 g (1000 ppm) of lithium bromide and 1.0 g (1000 ppm) sodium iodide and 18 g (1.8 phs of solvent) finely ground polyacrylonitrile polymer, which had a molecular weight of 150,000. The resulting solution was then heated and once the polyacrylonitrile dissolved to form a clear solution (about 130° C.) the temperature of the solution was raised to 150° C. Ten grams (1 phs) of triethanolamine or TEA was added and the solution was heated at 150° C. for another 30 minutes. A 25 μm thick, cotton bond paper liner was prepared for a casting dish with dimensions of approximately 11 cm×20 cm. This liner acted as a nucleating surface for the initiation of gelation from polyacrylonitrile/propylene carbonate solutions where the polyacrylonitrile concentration is low (less than about 3 phs). The casting dish was preheated to 150° C. Following heating in the presence of the TEA, the solution was poured into the paper-lined, preheated casting dish. This dish was covered with a porous, ceramic felt insulator which slowed heat loss and absorbed solvent vapors, thereby keeping condensed solvent from dripping back into the gel and destroying the gel structure.

The solution was allowed to cool in the dish overnight (16 hours) to provide for gelation of the polyacrylonitrile from the propylene carbonate. The resulting gel and liner were removed from the dish and immersed in methanol. Two methanol exchanges were made to reduce the propylene carbonate content of the gel to less than 2 wt %. The alcohol was then extracted from the gel by supercritical carbon dioxide extraction at a pressure of 1500 psi and a temperature of 40° C.

Upon completion of the solvent and alcohol extraction, the porous polyacrylonitrile foam was cross linked by reacting with vapor-phase maleic anhydride at 90° C. in a vacuum oven. This cross-linking step was found to be essential for the carbonization step. Foams that were carbonized without cross linking collapsed, densified, and cracked during air curing and carbonization. For example, a companion piece of foam as prepared in this Example but without undergoing the cross-linking step densified by a factor of 40 when carbonized as compared to densification factor of 5.7 for a carbonized piece of the cross-linked foam. Following cross linking, the foam was air cured by heating it in air at a temperature of 175° C. for a period of 14 days. The TEA addition was used to inhibit cracking and to assure that no combustion of the foam would occur in the event the curing temperature reached 180° C.

The air-cured polyacrylonitrile foam was then carbonized using the ramped or stepped heating and soaking sequence described above under an atmosphere of flowing argon at an ambient pressure. The resulting carbon foam possessed a uniform distribution of cell sizes with diameters less than 100 μm with the majority of these cells being of a diameter less than about 10 μm, well interconnected strut morphology providing the foam with open porosity, and an expanded d(002) X-ray turbostatic spacing greater than 3.5 angstroms.

Carbon foams with densities up to about 400 mg/cm$^3$ can be produced by using propylene carbonate alone as the solvent along with both lithium bromide and sodium iodide solubilizers. In the production of such higher density carbon foams, the concentration of the polyacrylonitrile dissolved in the solvent increased up to (8 phs). Thus, carbon foams with densities between 30 and 135 mg/cm$^3$ and between 135 and 400 mg/cm$^3$ can be respectively provided by using polyacrylonitrile in appropriate concentrations between about 0.75 to 1.8 phs and 1.8 to 8.0 phs of the propylene carbonate solvent. Polyacrylonitrile polymer foam densities varied essentially linearly as a function of the polyacrylonitrile solution content. The corresponding carbon foam densities are a factor of 5 to 6 higher than the polyacrylonitrile polymer foam densities.

Alternately, in the production with microcellular carbon foams with densities greater than about 400 mg/cm$^3$ the use of the propylene carbonate as the only solvent causes the solutions to become excessively viscous so as to inhibit easy processing. This excessive viscosity problem was easily obviated in accordance with the present invention by using tetramethylene sulfone or gamma-butyrolactone, preferably as a mixture with propylene carbonate as described above, since it was discovered that the tetramethylene sulfone and gamma-butyrolactone were better solvents for the polyacrylonitrile when producing carbon foams of densities greater than about 400 mg/cm$^3$ (greater than 8 phs PAN in solution). The additions of the tetramethylene sulfone or gamma-butyrolactone provided for the dissolution of more polyacrylonitrile than could be dissolved in propylene carbonate alone.

It was also found that the ratio of the propylene carbonate with tetramethylene sulfone or the gamma-butyrolactone had to be adjusted when such mixtures were used in order to optimize the gelation of the polyacrylonitrile in order to produce a rubbery, firm, and handable gel. As pointed out above, the ratios of about 70 to 90% propylene carbonate with 10 to 30% tetramethylene sulfone or 10 to 30% gamma-butyrolactone were found to be satisfactory. With increasing concentration of either tetramethylene sulfone or gamma-butyrolactone in the solvent mixture, the gels became increasingly closed-celled, making extraction of the solvent increasingly more difficult. Gels made with 100% tetramethylene sulfone were closed-celled which actually inflated during supercritical carbon dioxide extraction. The 30% sulfolane or gamma-butyrolactone cut off represents an empirical compromise which gives a satisfactory amount of open-celled character and adequate polymer solubility.

EXAMPLE 2

A polyacrylonitrile polymer foam having a density of 11 mg/cm$^3$ was produced using the method of Example 1. In this example, 7.5 g of polyacrylonitrile (0.75 phs) were dissolved in 1000 g propylene carbonate along with 1000 ppm lithium bromide and 1000 ppm sodium iodide and 1 phs TEA. The solution was put under vacuum to degas it prior to casting in a paper-lined glass dish as in Example 1. Following solvent exchange with methanol the gel was extracted in supercritical carbon dioxide as in Example 1. The resulting polymer foam was monolithic and nearly free of defects. It is expected that carbonization of this foam using the staged heating procedures as used in Example 1 and described above will produce a 30 to 50 mg/cm$^3$ carbon foam monolith.

EXAMPLE 3

The production of a microcellular carbon foam with the density of approximately 307 mg/cm$^3$ was achieved by forming a mixture of 1000 g propylene carbonate (99% purity), 1.0 g (1000 ppm) dry lithium bromide 1.0 g sodium iodide and 50 g of 150,000 MW polyacrylonitrile (5 phs or approximately 4.87 wt % of the mixture) to a temperature of 150° C. to dissolve the polyacrylonitrile which was indicated by the formation of a clear solution. After the dissolution of the polyacrylonitrile 10 g or 1 phs of TEA was added to the hot solution which was further heated for 30 minutes. The resulting clear solution was poured into a glass casting dish preheated to 150° C. The dish was then placed on an insulated surface and covered with porous insulator as described in Example 1. The gel was cooled for a duration of 16 hours to permit the completion of the phase inversion or gelation from the solvent mixture. The resulting foamed gel was then immersed in methanol for a sufficient period to replace the solvent with the alcohol. The methanol was exchanged five times. Density of the methanol propylene carbonate/methanol solution at the end of the fifth exchange was determined to be 0.7989 g/cm which corresponded to a propylene carbonate content of 3.5 wt %. Additional extraction studies found that up to 30% propylene carbonate content could be extracted with supercritical carbonization, provided the polyacrylonitrile polymer content exceeded 4 phs. The alcohol was then extracted from the gel by supercritical carbon dioxide at a pressure of 1500 psi and a temperature of 40° C. The resulting polyacrylonitrile polymer foam had a density of 61 mg/cm$^3$.

The evacuation, air curing, cross linking, and carbonization of the so produced porous foam of polyacrylonitrile was carried out as described in Example 1. The carbon foam had properties similar to those possessed by the carbon foam produced in Example 1 except, of course, for a difference in density.

EXAMPLE 4

A microcellular carbon foam having a density of 337 mg/cm$^3$ and possessing characteristics or properties similar to those provided for the carbon foams of Examples 1-3 was prepared by heating to 150° C. a mixture of 720 g (approximately 83 wt/%) propylene carbonate, 80 g (approximately 9 wt/%) tetramethylene sulfone, 0.8 g (approximately 1000 ppm) lithium bromide, 0.8 g (approximately 1000 ppm) sodium iodide, and 68.1 g (8.5 phs) 150,000 MW polyacrylonitrile, finely ground. To the clear solution at 150° C. 2 g or 0.25 phs piperazine was added to increase gel firmness. The clear solution containing the dissolved polyacrylonitrile was poured into a glass casting dish preheated to 150° C. and then covered and allowed to cool for a 16 hour period on an insulated surface to effect the formation of the gel by phase inversion. The resulting gel was subjected to the solvent replacement, extraction, evacuation, cross linking, curing, and carbonization steps as set forth in Example 1 above to provide the microcellular carbon foam. Other samples prepared with piperazine were very air sensitive and combusted during the curing step. The ratio of tetramethylene sulfone to propylene carbonate used this Example was 10% tetramethylene sulfone and 90% propylene carbonate.

EXAMPLE 5

A carbon foam of a density of approximately 550 mg/cm$^3$ was prepared from a mixture of 900 g propylene carbonate, 100 g tetramethylene sulfone, 1.0 g dry lithium bromide (1000 ppm), 1.0 g sodium iodide (1000 ppm), and 160 g (16 phs) polyacrylonitrile that was finely ground. Once the polyacrylonitrile had dissolved, 16.5 g or 1.65 phs TEA was added, and melt heated for another 30 minutes at 150° C. The hot solution containing the dissolved polyacrylonitrile was poured into a glass casting dish preheated to 150° C. and then the solution was allowed to cool to form a gel by the steps used in Example 1 above. Also, the solvent was exchanged with methanol, then extracted from the gel by supercritical carbon dioxide extraction, evacuated, cross linked with maleic anhydride, air cured, and then carbonized by employing steps as in Example 1 so as to provide a carbon foam of the aforementioned density but with other properties similar to the carbon foams prepared as in Example 1.

EXAMPLE 6

The effects of an extended air cure is demonstrated in this Example. A 306 mg/cm$^3$ carbon foam was prepared from a mixture of 900 g of propylene carbonate, 100 g tetramethylene sulfone, 1.0 g (1000 ppm) dry lithium bromide, 1.0 g (1000 ppm) dry sodium iodide, and 85 g (8.5 phs) finely ground polyacrylonitrile. Once the polyacrylonitrile had dissolved at about 130° C., 10 g (1 phs) of TEA was added, and then the melt was heated for an additional 30 minutes at 150° C. The hot solution was poured into a preheated glass casting dish and allowed to cool to form a gel by the steps used in Example 1. The solvent blend was then exchanged with methanol, which in turn was removed using supercritical carbon dioxide extraction. Trace amounts of solvents were removed from the resulting foam by heating under vacuum. A two-week period of cross linking with maleic anhydride vapor was followed by three weeks of curing in air at temperatures reaching 180° C. Carbonization followed the steps described in Example 1. The resulting carbon foam densified only by a factor of 3.5, compared to the foam following carbon dioxide extraction.

A gel foam as prepared in Example 4 was air cured for 3 weeks and densified by a factor of 3.3. In the way of comparison, Example 1 and 3 above were both air cured for about 2 weeks at temperatures reaching 180° C. During subsequent carbonization, these samples densified by factors of 5.7 and 5.0 respectively.

The Table below sets forth various comparisons including densification factors of the carbon foam prepared as in Examples 1,3,4 and 6. The air cure was at a temperature of less than 170° C.

TABLE

| Example No. | PAN Content (phs) | Foam Density After CO$_2$ Extraction mg/cm$^3$ | Weeks in Maleic Anhydride Vapor | Days Cured in Air | Carbon Foam Density mg/cm$^3$ | Densification Factor |
| --- | --- | --- | --- | --- | --- | --- |
| 1 | 1.8 | 23.5 | 1 | 6 | 134.4 | 5.7 |
| 2 | 5.0 | 61.0 | 1 | 4 | 307 | 5.0 |
| 3 | 8.5 | 102.4 | 1 | 14 | 337 | 3.3 |
| 6 | 8.5 | 87.1 | 2 | 10 | 306 | 3.5 |

Carbon foams with densities higher then described in the above examples and table can be obtained by either starting with a higher polyacrylonitrile polymer content and/or shortening the period for air curing, providing the polyacrylonitrile foam is allowed to become sufficiently brown in color to prelude excessive cracking during carbonization. By increasing the air cure time at temperatures below about 170° C. from about 4-6 days to 10-14 days the densification of the carbon foams can be significantly reduced over that achieved with same cure times under the same conditions.

It will be seen that the present invention provides for the fabrication of microcellular carbon foam of high purity by a phase inversion process which provides the carbon foam with an expanded d(002) X-ray turbostatic spacing exceeding 3.5 angstroms, which spacing is particularly attractive for the production of lithium batteries and super capacitors. This desirable turbostatic spacing is provided by employing alkali metal halides, in particular lithium bromide and sodium iodide, in the solvent solution during the phase inversion process due to the discovery that the alkali metal halides promote solubilization and the unraveling of the polyacrylonitrile molecules in solution as well as maintaining these unraveled molecules in spaced relationship for forming the expanded turbostatic spacing provided in the carbon foams of the present invention.

What is claimed is:

1. A precursor for a microcellular carbon foam characterized by a density in the range of about 30 to 1000 mg/cm$^3$, substantially uniform distribution of cell sizes of diameters less than 100 $\mu$m with a majority of the cells being of a diameter of less than about 10 $\mu$m, well interconnected strut morphology providing open porosity, and an expanded d(002) X-ray turbostatic spacing greater than 3.5 angstroms, with said foamed precursor prepared by
   a) dissolving polyacrylonitrile in a heated solution consisting essentially of at least one alkali metal halide and a solvent for the dissolution of a polyacrylonitrile in the heated solution and the phase inversion of the dissolved polyacrylonitrile to a liquid gel upon sufficient cooling of the heated solution, said heated solution of a solvent and at least one alkali metal halide containing the polyacrylonitrile consisting essentially of about 0.75 to about 30 wt. % polyacrylonitrile, about 68 to 97 wt. % solvent, and a sufficient concentration of at least one alkali metal halide to promote solubilization and the unraveling of molecules of polyacrylonitrile in solution and maintain these molecules in extended positions to promote a firm gel, an interconnected strut formation and an expanded d(002) X-ray turbostatic spacing during the formation of the gel by phase inversion;
   b) placing the heated solution including the dissolved polyacrylonitrile in containment means provided with one of a nucleating promoting means and a relatively smooth surface;
   c) sufficiently cooling the heated solution in the containment means to form a liquid gel of the polyacrylonitrile by phase inversion;
   d) removing the solvent and substantially all of the dissolved alkali metal halide from the gel to provide a porous foam consisting essentially of polyacrylonitrile;
   e) removing the residual solvent under vacuum;
   f) cross linking the dry polyacrylonitrile foam at an elevated temperature;
   g) curing the porous foam at an elevated temperature in an oxygen containing environment.

2. A precursor for a microcellular carbon foam as claimed in claim 1, wherein the solvent is selected from the group consisting of propylene carbonate, tetramethylene sulfone, gamma-butyrolactone, and mixtures thereof.

* * * * *